United States Patent
Brouwer et al.

(10) Patent No.: US 11,485,294 B2
(45) Date of Patent: Nov. 1, 2022

(54) MOVABLE IMAGE RECORDING DEVICE AND VEHICLE PROVIDED WITH SUCH DEVICE

(71) Applicant: MCi (Mirror Controls International) Netherlands B.V., Woerden (NL)

(72) Inventors: Stefan Fritz Brouwer, Schoonhoven (NL); Rudolf Pieter Hoogenboom, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 0 days.

(21) Appl. No.: 17/114,007

(22) Filed: Dec. 7, 2020

(65) Prior Publication Data
US 2021/0094481 A1 Apr. 1, 2021

Related U.S. Application Data

(63) Continuation of application No. 16/505,301, filed on Jul. 8, 2019, now Pat. No. 10,882,466, which is a
(Continued)

(30) Foreign Application Priority Data

Sep. 18, 2015 (NL) ...................................... 2015468

(51) Int. Cl.
*B60R 11/04* (2006.01)
*B60S 1/56* (2006.01)
(Continued)

(52) U.S. Cl.
CPC ................. *B60R 11/04* (2013.01); *B60S 1/04* (2013.01); *B60S 1/46* (2013.01); *B60S 1/54* (2013.01);
(Continued)

(58) Field of Classification Search
CPC ........ G03B 17/02; G03B 19/04; G03B 17/30; G03B 2217/002; G03B 17/04;
(Continued)

(56) References Cited

U.S. PATENT DOCUMENTS 5,027,200 A * 6/1991 Petrossian ................. B60R 1/00
348/118
6,734,914 B1 5/2004 Nishimura et al.
(Continued)

FOREIGN PATENT DOCUMENTS

| CN | 102267419 A | 12/2011 |
|---|---|---|
| CN | 102792674 A | 11/2012 |

(Continued)

*Primary Examiner* — Clayton E. LaBalle
*Assistant Examiner* — Kevin C Butler
(74) *Attorney, Agent, or Firm* — Volpe Koenig

(57) ABSTRACT

Image recording device provided with a fixed part for at least partial inclusion in and/or on the body of a motor vehicle, and a movable part which comprises at least one optical element, the optical element comprising at least one optical sensor and/or a lens unit, and an adjustment device provided with a power source, for adjusting the movable part between a first position and a second position, wherein during use in the first position the movable part is wholly or partly included in the body, and in the second position the movable part extends at an angle with respect to the body, such that at least the optical element carried by the movable part extends at least partly outside the body, wherein the movable part pivots from the second position about a, preferably substantially vertical, axis to the first position and vice versa.

32 Claims, 11 Drawing Sheets

Related U.S. Application Data continuation of application No. 15/760,997, filed as application No. PCT/NL2016/050640 on Sep. 16, 2016, now Pat. No. 10,343,621.

(51) Int. Cl.

| | | |
|---|---|---|
| *G03B 17/02* | (2021.01) | |
| *H04N 5/225* | (2006.01) | |
| *G03B 17/30* | (2021.01) | |
| *B60S 1/04* | (2006.01) | |
| *B60S 1/46* | (2006.01) | |
| *B60S 1/54* | (2006.01) | |
| *G02B 27/00* | (2006.01) | |
| *G03B 17/04* | (2021.01) | |
| *G08B 13/196* | (2006.01) | |
| *G03B 17/00* | (2021.01) | |
| *F16M 11/18* | (2006.01) | |
| *B60R 11/00* | (2006.01) | |

(52) U.S. Cl.
CPC ............ *B60S 1/56* (2013.01); *G02B 27/0006* (2013.01); *G03B 17/02* (2013.01); *G03B 17/04* (2013.01); *G03B 17/30* (2013.01); *H04N 5/2252* (2013.01); *B60R 2011/004* (2013.01); *B60R 2011/0082* (2013.01); *B60R 2011/0085* (2013.01); *B60R 2011/0092* (2013.01); *B60R 2011/0094* (2013.01); *F16M 11/18* (2013.01); *G03B 17/00* (2013.01); *G03B 2217/002* (2013.01); *G08B 13/1963* (2013.01); *G08B 13/19613* (2013.01); *G08B 13/19632* (2013.01)

(58) Field of Classification Search
CPC ...... G03B 17/00; H04N 5/2252; B60R 11/04; B60R 2011/004; B60R 2011/0082; B60R 2011/0085; B60R 2011/0092; B60R 2011/0094; B60S 1/04; B60S 1/46; B60S 1/54; B60S 1/56; G02B 27/0006; F16M 11/18; G08B 13/19613; G08B 13/1963; G08B 13/19632

USPC ......................................................... 396/535
See application file for complete search history.

(56) References Cited

U.S. PATENT DOCUMENTS

| | | | | |
|---|---|---|---|---|
| 7,891,886 | B2* | 2/2011 | Schuetz | H04N 5/247 396/427 |
| 2006/0256459 | A1* | 11/2006 | Izabel | B60S 1/566 359/872 |
| 2010/0040361 | A1 | 2/2010 | Schuetz | |
| 2011/0211062 | A1 | 9/2011 | Kamps et al. | |
| 2011/0266375 | A1* | 11/2011 | Ono | B60S 1/54 239/589 |
| 2012/0007984 | A1 | 1/2012 | Schütz | |
| 2013/0209079 | A1 | 8/2013 | Alexander et al. | |
| 2014/0092495 | A1 | 4/2014 | Bowers et al. | |

FOREIGN PATENT DOCUMENTS

| | | | |
|---|---|---|---|
| CN | 103253209 A | 8/2013 | |
| CN | 104684769 A | 6/2015 | |
| CN | 104797971 A | 7/2015 | |
| CN | 112428938 A | 3/2021 | |
| DE | 202005017430 U1 | 9/2006 | |
| DE | 102010008346 A1 | 8/2011 | |
| DE | 102011102773 A1 | 6/2012 | |
| DE | 102013202300 * | 8/2013 | ............... B60S 1/56 |
| DE | 102013202300 A1 | 8/2013 | |
| DE | 102012015395 B3 | 11/2013 | |
| DE | 102014018552 B3 | 4/2016 | |
| EP | 2076408 A2 | 7/2009 | |
| EP | 2543546 A | 1/2013 | |
| EP | 2930293 A2 | 10/2015 | |
| JP | 2001058543 A | 3/2001 | |
| JP | 2003104123 A | 4/2003 | |
| JP | 2013-014260 A | 1/2013 | |
| JP | 2014231334 A | 12/2014 | |

\* cited by examiner

MOVABLE IMAGE RECORDING DEVICE AND VEHICLE PROVIDED WITH SUCH DEVICE

CROSS REFERENCE TO RELATED APPLICATION

This application is a continuation application, and claims the benefit of U.S. Non-Provisional application Ser. No. 16/505,301 filed on Jul. 8, 2019 and U.S. Non-Provisional application Ser. No. 15/760,997 filed on Mar. 16, 2018 which issued as U.S. Pat. No. 10,343,621 on Jul. 9, 2019, which is a 35 USC § 371 National Stage application of International Patent Application No. PCT/NL2016/050640, which was filed Sep. 16, 2016, and Netherlands Patent Application No. 2015468, which was filed Sep. 18, 2015, and are incorporated herein by reference as if fully set forth.

FIELD OF INVENTION

The invention relates to a camera house placed at a side of a motor vehicle.

BACKGROUND

DE102011102773A1 discloses a camera included in a housing which in a storage position can be included in a body part of the car and in a use position can be pivoted out of it, so that the camera can record an image rearward. The lens or window of the camera in the use position is situated directly beside the outer surface of the body part. Further, this device should have a movable house having a shape that in the use position aligns against the inner side of the body part. This makes the freedom of design and the pivotability of the housing limited and moreover entails insufficient closure against soiling, also within the body part.

Such a device has the disadvantage that the camera can record only a limited image due to the body. Conversely, the camera cannot pivot further out of the body because this jeopardizes the safety of, for example, fellow road users. Further, this device has the disadvantage that it soils rapidly, in particular an optical element, such as the lens, thereof.

U.S. Pat. No. 5,027,200 discloses a passenger car having on opposite sides of the nose of the car, above the wheel houses thereof, in each case at least one camera in a camera housing. The housing is carried in a carrying bracket on a telescoping shaft or a linkage construction, so that the carrying bracket with the camera housing and the camera arranged therein can be moved between a first position in which these are situated within the body of the car and a second position in which the bracket with the camera housing have been brought outside the body. A lid hinged to the body can close off the cavity in which the camera housing and carrying bracket are stored in the first position. The lid is opened and closed by its own motor drive.

This construction has as a disadvantage, for one thing, that the camera house is particularly vulnerable in the second position, for instance if the vehicle inadvertently moves closely past an obstacle and the camera house is hit by the obstacle in the driving direction. In addition, the lid here needs to be kept in the opened position, which renders the construction still more vulnerable. Further, in the second position this device is only aerodynamic to a particularly low degree and this will lead to a relatively great deal of additional noise and soiling, in particular also of the cavity in which the camera housing can be stored.

SUMMARY

It is an object of the invention to counteract the above-mentioned disadvantages at least partly and/or to present an alternative for such a device.

It is an object of the invention to provide a device for replacing and/or supplementing a wing mirror of a vehicle.

It is an object of the invention to provide a device for providing vision in the direction of a lateral side and/or rear side of a vehicle, from a driver's position in the vehicle, with the aid of a camera or like, preferably electronic, optical device.

It is an object of the invention to provide a device for building-in in and/or on a body part which is part of a lateral side of a vehicle, which device comprises at least a camera or like, preferably electronic, optical device which with the aid of the device is movable between a use position and a storage position.

In an aspect, the invention provides an image recording device provided with a fixed part for at least partial inclusion in and/or to the body of a motor vehicle, and a movable part which comprises at least one optical element. The movable part is movable relative to the fixed part. The optical element comprises at least one optical sensor and/or a lens unit. An adjustment device provided with a power source is provided for adjusting the movable part between a first position and a second position. During use, in the first position the movable part is mainly included in and/or against the body, and in the second position the movable part extends at an angle with respect to the body, such that at least the optical element carried by the movable part extends at least partly outside the body. The movable part pivots from the second position about a, preferably substantially vertical, axis to the first position and vice versa.

In an aspect, the invention provides an image recording device that makes a fold-in, a fold-out and a fold-over possible.

In an aspect, the invention provides an image recording device where a mechanical cleaning device is provided, in particular a wiping device for cleaning of a surface of an optical element, such as, for example, a lens surface and/or a window for such an optical element. In an advantageous embodiment, the cleaning device is driven by the same power source, in particular the same motor, as the movable part.

In an aspect, the invention is characterized by a vehicle, provided with at least one image recording device included in a body part of the vehicle, in particular in a lateral side of the vehicle. Due to electronic images being recorded, the position of the or each recording device can be chosen optimally, without it needing to be directly visible from a driver's position in the vehicle. The images can be simply displayed in the vehicle on a display.

It is incidentally noted that instead, or additionally, a different registering means may be included in the movable part, such as, for example, a radar, ultrasonic device, or lidar.

Further advantageous embodiments are set forth in the subclaims.

It is incidentally noted that it is known to use cameras on the rear side of cars, for instance to make reversing safer, to be able to observe the rear side of the car from the car, or, for instance, to be able to monitor a trailer hitched to the car. Examples of such cameras are given, for example, in EP2076408 and US2011266375.

EP2076408 discloses a vehicle where a camera, as a park help, is placed behind a part of the body that can be swung clear. This camera house is activated by a switch coupled to the reverse gear of the car, so that the camera comes out only when the car is going to back up. An important disadvantage is that when the camera house is activated, with the movable part extending outside the body, the second, fixed part is exposed to the outside air, so that moisture, sand and other irregularities have free access to the interior of the camera house, which is unwanted. In the case of a backing camera, this is of little influence because it is exposed to the outside air only to a limited extent and moreover at very low speeds. Moreover, the camera is directed downward and is protected for the most part by the part of the body formed by a guard.

US2011266375 discloses a backing camera again, with a lens unit provided with a cleaning device consisting of a nozzle for pressurized application of a cleaning fluid. Thus, the lens can for instance be made ice-free or be cleared of dirt. A disadvantage of such cleaning units is that the cleaning fluids to be used are relatively costly, and always available only in a finite supply.

BRIEF DESCRIPTION OF THE DRAWINGS

The invention will be elucidated on the basis of exemplary embodiments which are represented in figures. In the drawing:

FIG. 4A shows a perspective view of an image recording device after partial fold-in;

DETAILED DESCRIPTION OF THE PREFERRED EMBODIMENTS

Figure 1:
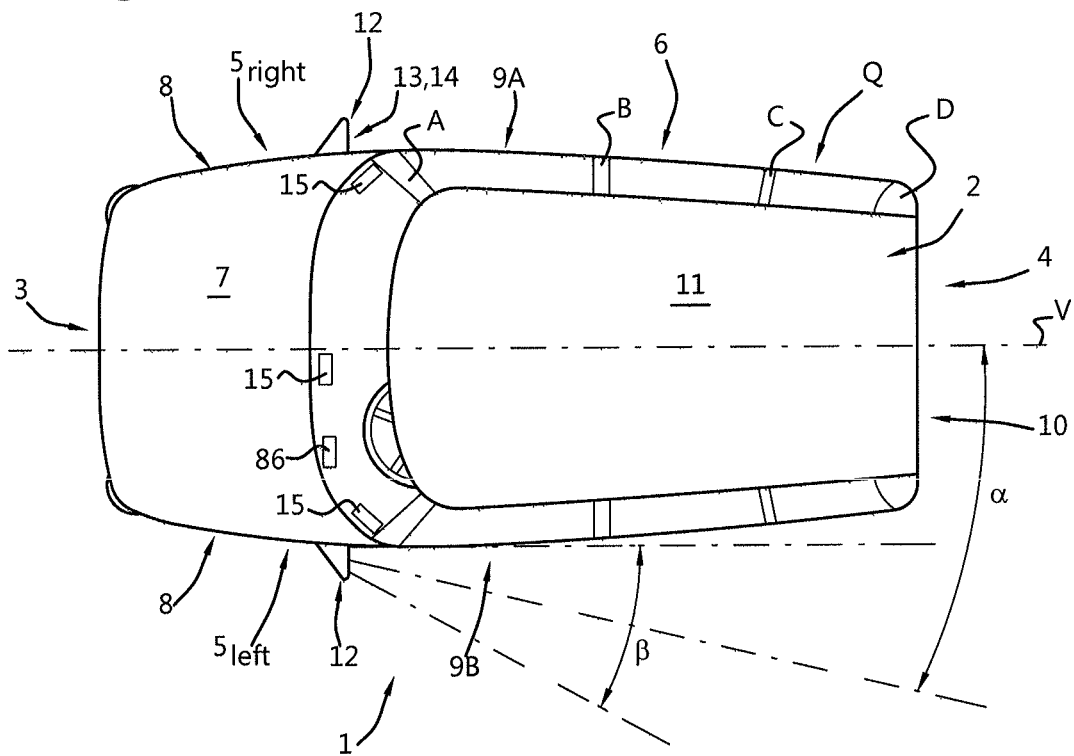
FIG. 1 shows in top plan view a vehicle provided with devices according to this disclosure.

In this description, like or corresponding parts have like or corresponding reference numerals. The invention is elucidated on the basis of the examples hereinafter described and shown, but is not limited thereto. For instance, in the figures, a passenger car is used as an example of a vehicle. However, other vehicles according to the invention may also be provided, such as, for example, trucks, motor cycles and motor scooters, rail vehicles, work vehicles and the like. The drawings in this disclosure are schematic representations of possible embodiments and, unless expressly stated otherwise, are not necessarily represented to scale.

In this description, front side, rear side, bottom side and top side and lateral side of a vehicle are to be understood in relation to a normal driving position of the vehicle. By the same token, forward, and rearward, sideward and up or down are to be understood as related to the normal driving position of a vehicle.

In this description, indications such as 'substantially' and like indications are to be understood as indicating that a quantity or position being referred to may be deviated from to some extent, for example, by at least 25%, more particularly at least 15%, as for example at least 10%, without falling outside the definition.

FIG. 1 schematically shows in top plan view a vehicle 1. Represented in this example is a passenger car, in particular a station wagon. In FIG. 1 the car 1 is shown from the top side 2, with the front side 3 facing leftwards, the rear side 4 facing rightwards. Left and right lateral sides are indicated by reference numeral 5, where necessary 5left or 5right. The bottom side is indicated by reference numeral 6. In FIG. 1 there are shown a hood 7 with on opposite sides a front fender 8, doors 9A and side panels 9B and a hatchback 10. The roof 11 is connected in the usual manner with the further bodywork such as the above-mentioned hood, fenders, side panels and the like via respective A, B, C and D posts. Clearly, vehicles may also have fewer or different posts and body parts. In this description, for simplicity, the different body parts such as 7, 8, 9A, B, 10, 11 will also be individually and/or jointly designated as body part Q.

Figure 1A:
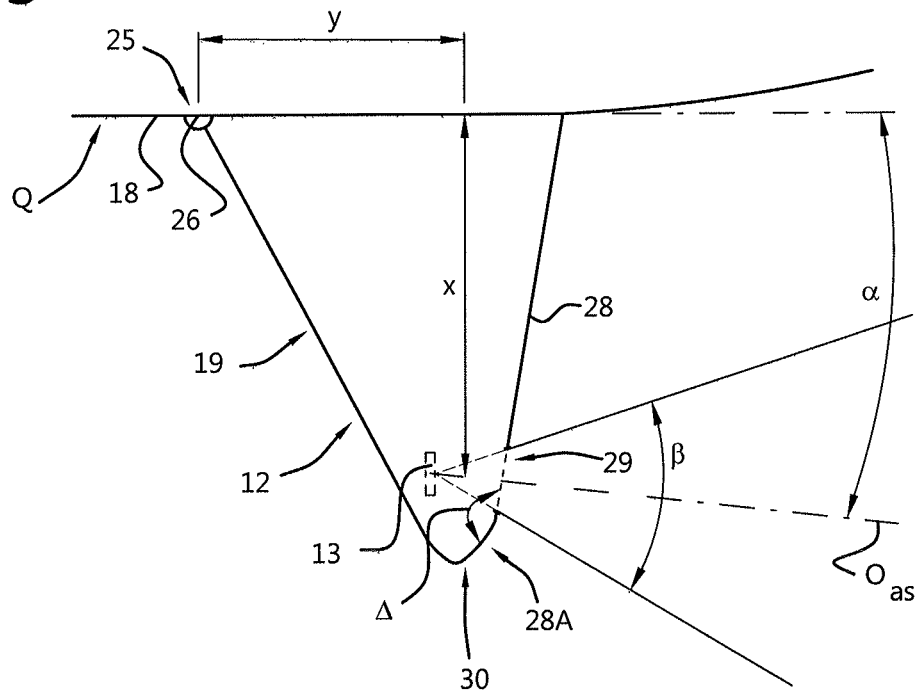
FIGS. 1A and 1B schematically show in top plan view and side view, respectively, a device according to the invention.
Figure 1B:
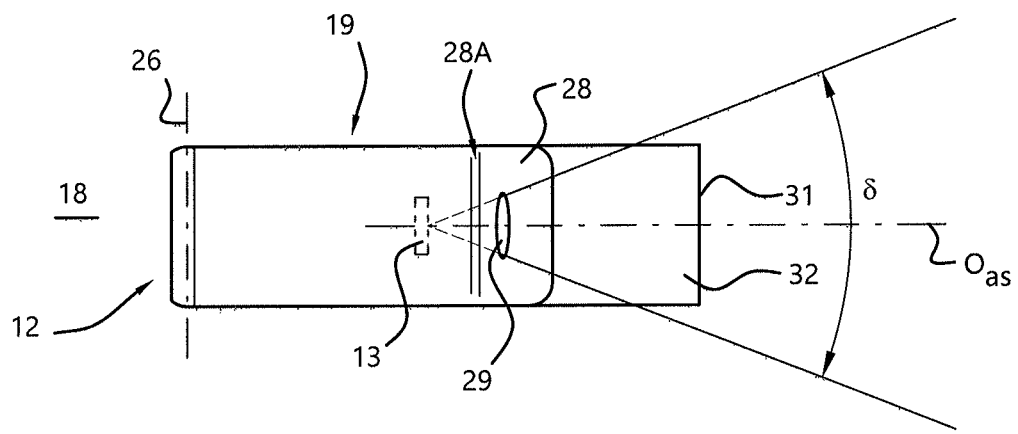

In FIG. 1, by way of illustration, on opposite sides of the car, that is, on the opposite lateral sides 5, an image recording device 12 according to the invention has been included, in a use position. Clearly, such a device may also be provided only on one lateral side, or a plurality of such devices 12 may be provided. In FIG. 1 the devices 12 are placed at the location of, at least, in, the front fenders 8 or side panels 9A. However, they may also be positioned otherwise, for example in a door 9B or in one of the posts A-D. In the example shown, the devices 12 have an angle of view $\alpha$, a horizontal angle of vision $\beta$ and vertical angle of vision $\delta$ which face toward the rear side 4. In this description, angle of view $\alpha$ is to be understood to mean the angle included between the vertical median longitudinal plane V of the car, extending vertically from front to back, centrally through the car, and the central optical axis O axis of an image recording sensor 13 in the device 12 and/or of a lens or lens system 14 thereof, as will be further elucidated hereinafter. Angle of vision $\beta$ and $\delta$ should be understood to mean the angle included by the boundaries of the image plane of the sensor 13 and/or of the lens or lens system 14 thereof. In FIGS. 1A and B the angles $\alpha$, $\beta$ and $\delta$ are drawn in. The angle of view and the angles of vision may be fixed by the sensor and/or the lens or lens system, or may be mechanically and/or electronically adjustable, as will be elucidated hereinafter. In embodiments, the view and vision angles of at least one device may also be directed differently, for example, towards the front side 3, sidewardly and/or up or down. In embodiments, the device may be implemented such that in different positions thereof the angle of view and/or angle of vision are directed differently.

In this description, an image recording device 12 is described, for use in a vehicle 1. In embodiments, such a device 12 comprises a housing which can be included in a body part of the vehicle 1, while in or on the housing at least a carrier is provided for carrying a camera house and/or a camera and/or an optical sensor and/or a lens or lens system for use with such a camera or optical sensor. Lens or lens system is herein understood to also encompass a prism or mirror for transmitting light to a camera or optical sensor. In this description, sensor, camera and/or lens or lens system may also be referred to as optical elements.

In this description the carrier will be designated as part of a movable part of the device, the housing as part of a fixed part of the device. Fixed part should herein at least be understood to mean a part that is connected to the body and in normal use is stationary relative to the body. Movable part should herein be understood to mean a part of the device that can move, in particular pivot, relative to the fixed part. A movement mechanism, such as a pivoting mechanism, is provided for moving the movable part relative to the fixed part. Pivoting is possible around a real axis and/or around a virtual axis. With the aid of the carrier, a relevant optical element can be moved between a first position in which it is at least substantially enclosed within the housing and/or a body part in which the housing is placed, and a second position in which it extends at least partly outside the housing and/or the respective body part, in order to present a desired view angle and vision angles. In the first position, preferably, an outwardly facing part of the housing and/or the carrier is formed by or provided with a housing part that is substantially flush with a surrounding part of the body part in which the housing is included. Alternatively, a portion thereof may extend outside an outer surface of the respective body part, but less so than in the second position. In embodiments, still further positions may be provided, for instance for providing different view and/or vision angles.

In embodiments, the carrier can be pivoted between the first and second position, preferably driven by a motor and/or a driving mechanism, in particular a pivoting mechanism. In embodiments, the carrier can be pivoted, viewed from the first position, beyond the second position, for instance by exertion of a pressure force on the carrier or a structural member or optical element carried thereon, such as, for example, a blow upon a collision. This means the device will then yield and thereby appreciably reduce the forces occurring upon the blow. With this, a device 12 is obtained that can take up a fold-in, fold-out and fold-over position, whereby in the fold-in position the whole device is substantially and preferably wholly included in a body part of the vehicle, or at least abuts against the body such that the carrier extends considerably less in sideward direction, in the fold-out position desired view and vision angles are presented, and in the fold-over position the security of the device is enhanced. Additionally and/or alternatively, the housing may be so included in and/or on the body part that the whole housing or a relevant part thereof can be pressed further into the body part, preferably resiliently, when on a part of the device 12 projecting outside the body part a pressure force is exerted, for instance by a blow in a crash. The housing and hence the device 12 can thereby be brought into a position at least partly comparable to the fold-over position as described earlier. Preferably, the carrier is biased under spring tension, so that it is forced back from the fold-over position to at least the second position.

A device according to the invention may, in embodiments, be provided with a cleaning device for cleaning of an optical element, in particular for cleaning of a surface thereof that faces outside the body and/or the housing. In embodiments, a cleaning device may be provided for cleaning of a surface of a vision transmissive part of the housing, a lens or lens system. In particularly advantageous embodiments, a drive is provided for drive of a carrier for a camera house and/or optical element as described between at least the first and the second position, which drive is moreover configured for drive of the cleaning device. The drive can comprise an electric motor. The drive may be so configured that a motor between the first and the second position drives the carrier and, with the carrier in the second position, drives the cleaning device without thereby further driving the carrier. To that end, for example, a slip coupling may be provided, between the drive for the carrier and a motor therefor, or in the second position the drive for the carrier may be decoupled, for example electronically or mechanically, such that the motor can continue to rotate for drive of the cleaning device, without further driving the carrier. In embodiments, the cleaning device can comprise a wiper going back and forth, for instance a wiper reciprocating over a lens surface, driven by a rotary movement of a motor. In embodiments, a motor may be provided for drive of the carrier and the cleaning device, the motor being provided on two opposite sides thereof with a driving shaft, with which the carrier and the cleaning device, respectively, are driven.

In advantageous embodiments, a device according to this disclosure may be provided with a housing having a passage opening which during use faces outside the vehicle when the housing is included in a body part of the vehicle. A carrier of the device, for instance as described above or elucidated hereinafter, can move with at least an optical element through the opening, in order to move the optical element from a first position to a second position or vice versa. The device may furthermore be provided with at least one lid which can close off at least a portion of the opening when the carrier with the optical element has been brought into the second position such that the carrier extends through the opening. Preferably, each lid of the one or more lids in the second position links up with the carrier and/or a camera house carried thereon and/or wholly or partly formed thereby, so that the part of the opening left clear by the carrier and/or the camera house is at least largely and preferably substantially wholly closed off. Preferably, each lid of the one or more lids is then so positioned that the outer side(s) thereof is or are approximately in the plane of the surrounding housing and/or a surrounding body part. In advantageous embodiments, each lid of the one or more lids is included within the housing with the carrier in the first position, while a shaped part of the carrier and/or a camera house carried thereon or at least partly formed thereby and/or a plate part carried thereby, closes off the opening, and preferably an outer side of the shaped part or plate part is or are approximately in the plane of the surrounding housing and/or a surrounding body part, or at least link(s) up therewith relatively smoothly. The one or more lids can function as cover plate. The one or more lids may be under spring action, with a bias toward the closed position, or may be moved by, for example, a motor, bimetal or memory shape metal or other known means.

The above aspects of the invention and disclosure can be applied individually and in combination in devices according to the invention. Examples thereof will be further described hereinafter with reference to the drawings.

It will be clear that an image recording device 12 according to the invention may be coupled in a known manner to at least an image display device such as a viewing screen 15 which can be arranged at a suitable position in or on the vehicle 1. For example, such a screen may be provided in or on a dashboard or on an inner side of a door 9B of the vehicle, or, for example, a heads up display device may be used. A control unit 86 may be provided for controlling the optical device and/or the display device.

Figure 2A:
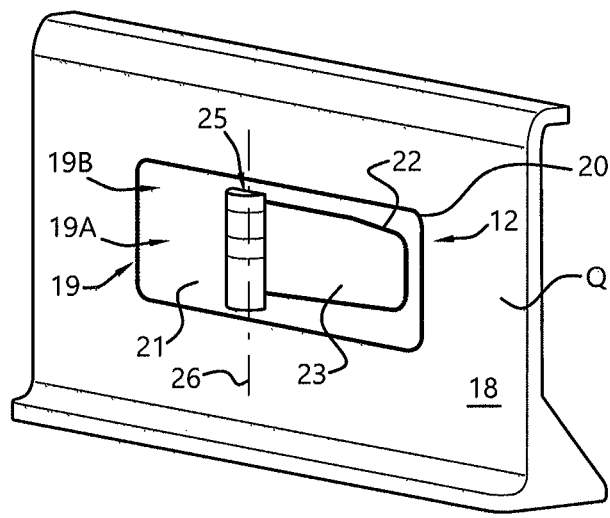
FIGS. 2A and 2B show a perspective view of bodywork with image recording device in a first position and a second position.
Figure 2B:
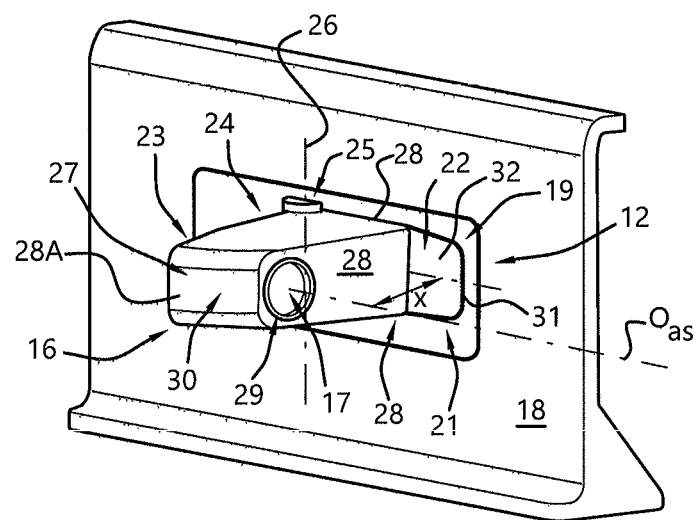

FIGS. 2A and 2B show schematically and in perspective view a part of a body part Q having included therein an image recording device 12. In FIG. 2A the latter is shown in a first, stored position. In FIG. 2B it is shown in a second position, in which, in this embodiment, a carrier 16 with an optical element 17 has been brought at least partly outside the outer surface 18 of the respective body part Q, so that images of areas outside the vehicle can be recorded and processed. In FIG. 2A an outer side 21 of a housing 19 of the device 12 is shown, included in a recess 20 in the respective body part Q. As will be shown in more detail, in the housing 19 a carrier 16 is included, as well as at least drive means for the carrier 16. The housing 19 may be manufactured, for example, from metal and/or plastic and may, on the outer side 21 shown in FIG. 2, be provided with a finish matching the body part Q. The outer side 21 shown is preferably approximately in the plane 18 of the body part Q. In the embodiment shown, the outer side 21 is approximately straight, but it may also be curved in one or more directions or be otherwise shaped in order to conform to the shape of the body part Q. In the outer side 21 a passage opening 22 is provided, closed off in the first position by a part 23 of a camera house 24 and/or the carrier 16 and/or a plate part carried thereon that forms said part 23 at least partly. In embodiments, the carrier 16 may be part of, or wholly define, a camera house 24. When movement of the carrier 16 is mentioned, this may therefore, where applicable, also mean movement of the camera house 24, unless expressly stated otherwise.

Visible, schematically, is a hinge 25 which defines a substantially vertical hinge axis 26, around which the carrier 16 can pivot between at least the first and the second position. In FIG. 2B the carrier 16 with the camera house 24 has been pivoted into the second position, in which an optical element 17 has been brought outside the body, up to a distance X from the outer surface 18. The distance X has been determined along the normal to the outer surface 18, or the outer side of the housing 19, that crosses the optical axis of the optical element, between the outer side 18 and the optical axis. This distance X can be chosen depending on the vehicle, and is, for example, between 20 and 200 mm, more particularly between 40 and 120 mm, for example, between 50 and 100 mm. The apex 30 is at a distance Y from the hinge line 26, measured perpendicular to the distance X, as shown in FIG. 1A. The distance Y is preferably in the order of magnitude of the distance X, for example, approximately equal thereto or smaller than the distance X. By choosing the distance Y to be relatively small, in particular smaller than the distance X, a compact construction will be obtained and an interplay of forces advantageous for fold-over. This is because the apex 30 upon such fold-over will move out less than when the distance Y is chosen to be greater. In advantageous embodiments, for example, the distance Y can be between 1.5 and 0.2 times the length X, for example between 1.2 and 0.2 times. In embodiments, the distance Y can be between 0.3 and 1 times the length X.

In the embodiments shown in FIGS. 1-5, 8 and 9, the distance Y, from the normal, is directed forwards, that is, in the direction of the front side 3 of the vehicle 1, while in FIG. 10 the distance is directed towards the rear side 4 of the vehicle 1.

In preferred embodiments, the distance X is chosen such that the horizontal vision angle β on the side proximal to the vehicle is bounded by a line approximately parallel to the centerline V of the vehicle, or at least is adjustable to that effect, so that optimum vision rearwards is obtained. In embodiments, the vision angle may be such that also a portion of an outer surface 18 of the vehicle 1 rearwardly of or forwardly of the device 12 can be seen, so that this portion, for instance, can serve as a reference for a driver or, for example, for the control unit 86.

As shown in FIGS. 1-5 and 8, the wall 28 between the apex 30 and the lens opening 29 can have a wall part 28A that is to some extent at an angle A with respect to the further wall 28, in particular such that the wall part 28A, from the wall 28, deviates outwards in the direction of the hinge line. As a result, the apex 30, measured along the distance Y, lies closer to the hinge line 26 than the lens opening 29, at least, than the transition between the wall 28 and the wall part 28A. As a consequence, a force that is exerted on the housing in the second position by a ball—such as, for example, used in mirror tests, for example as according to a norm according to Directive 70/156/EEC as effective on the date of filing of this application—with which, for example, a collision with a human head or other body part can be simulated, can be taken up better. The ball which in such a test swings approximately parallel to the surface 18 of the body part Q, will be able to push away the carrier 16 more easily without the ball being pushed away outwards unallowably. Moreover, there's less chance of injury of a human or animal coming into contact with the housing. Incidentally, instead of a substantially planar wall part 28A, also a bent wall part may be used between the lens opening 29 and the apex 30.

As shown in FIGS. 2A,B, the carrier 16 may be included in or integrated with a camera house 24, and the camera house 24, the carrier 16 or the combination thereof has a substantially closed outer surface 23, 27, at least insofar as, in the second position, it extends outside the body, or outside the housing 19. On the side of the hinge 25 and at the top and bottom sides, the outer surface 23, 27 substantially adjoins edges 28 of the passage opening 22, while in the first position the part 23 adjoins them. On a side located opposite the part 23, the camera house 24 and/or the carrier 16 also form a closed wall 28, in which a lens opening 29 is provided behind which at least one optical element 14 is provided. The wall 28, in the exemplary embodiment shown, connects the top and bottom of the camera house 24 and extends from an apex 30 at least up to and preferably slightly beyond the passage opening 22. The apex 30 should herein be understood as the edge of the camera house 24 that in the second position extends farthest from the outer surface of the body part 18, measured along the line along which the distance X is measured or a line parallel thereto. The camera house 24 is preferably substantially closed, in particular preferably substantially water- and dust-tight.

The camera house 24 and/or the carrier 16 may be shaped such that in the second position the wall 28 links up with the longitudinal edge 31 remote from the hinge. This, however, can have the consequence that the wall 28 will include a relatively large angle with the outer surface 18 of the body part Q and that the optical axis of the optical element 14 will include a relatively great angle with the wall 28. This can mean that the vision angles are limited and/or a relatively large lens opening 29 needs to be provided. Moreover, this can lead to a relatively large housing 19. The wall 28 can be bent such that, at the location of the lens opening 29, it extends approximately perpendicular to the body part Q and nonetheless links up with the edge 31. With this, the first-mentioned drawback is largely remedied but the second drawback remains. In the embodiment shown, the wall 28 is approximately straight, at least the part between the passage opening 22 up to a point beyond the lens opening 29. Between the wall 28 and the edge 31 of the passage opening 22 remote from the hinge 25, in the second position, a part of the passage opening 22 is not closed off by the carrier 16 and/or the camera house 24. In order to prevent ingress of water and/or dirt or other matter into the housing 19, in this embodiment a lid 32 is provided which in the second position closes off the relevant part of the passage opening, in a closing position. The lid 32 adjoins the camera house 24 and/or the carrier 16 and the edge of the passage opening 22. The lid 32 can be, for example, hingedly mounted to the housing 19 and/or to the camera house 24, or the carrier 16, such that in the first position the lid is swung away in the housing and in the second position is brought into the closing position, for example by a spring 34 (FIG. 4A) or by the movement of the camera house and/or the carrier, or by a separate drive. The lid 32 may be integrated with the camera house 24 and/or the carrier 16. Clearly, instead of a single lid, a series of lids or lid parts may be provided which can jointly close off a residual part of the passage opening. In such implementations, the inner space of the housing is protected from soiling, both in the first and in the second position.

Figure 2C:
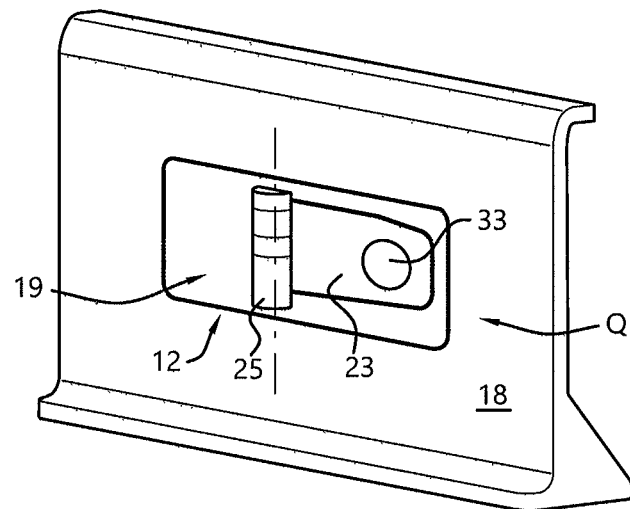
FIG. 2C schematically shows a view according to FIG. 2A, of an alternative embodiment, with a window.

As appears from FIG. 2A, in the first position, substantially the whole device 12 is included in the body part, so that the outer side 18 thereof continues substantially wholly smoothly. Clearly, the outer side of the housing and/or the camera house 24, at least part 23 thereof, may be designed differently, for instance for the purpose of creating a relief. Part 23 may be wholly closed. In it, however, also a window 33 may be provided, as schematically represented in FIG. 2C. The window 33 may be formed by an optical element 14, or such an element may be provided behind it, so that recordings can be made through the window 33 with the aid of an optical sensor, in particular also in the first position. This optical sensor can be the same sensor 13 as that described earlier, or a separate sensor 13A (not shown). Also, a camera or an optical element 14 may be movable within the housing 19, so that recordings are made either through the lens opening 29 or through the window 33. This arrangement can also be implemented such that recordings can be made at the same time through the window 33 and through the lens opening 29, for instance to be able to make recordings forward and rearward. Incidentally, in a similar manner, provision can be made for the possibility of making recordings upward and/or downward, for instance to detect road markings, traffic signs, traffic lights, fellow road users and the like with the aid of image recognition techniques and software known per se.

Figure 3A:
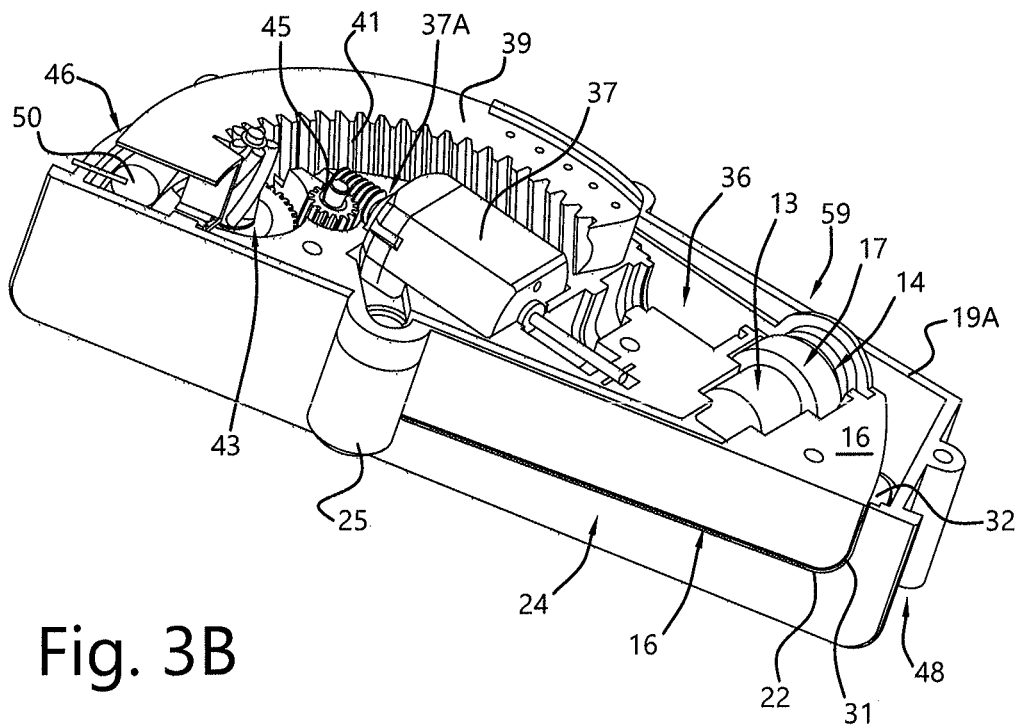
FIG. 3A shows a perspective view of an image recording device in the first position.
Figure 3B:
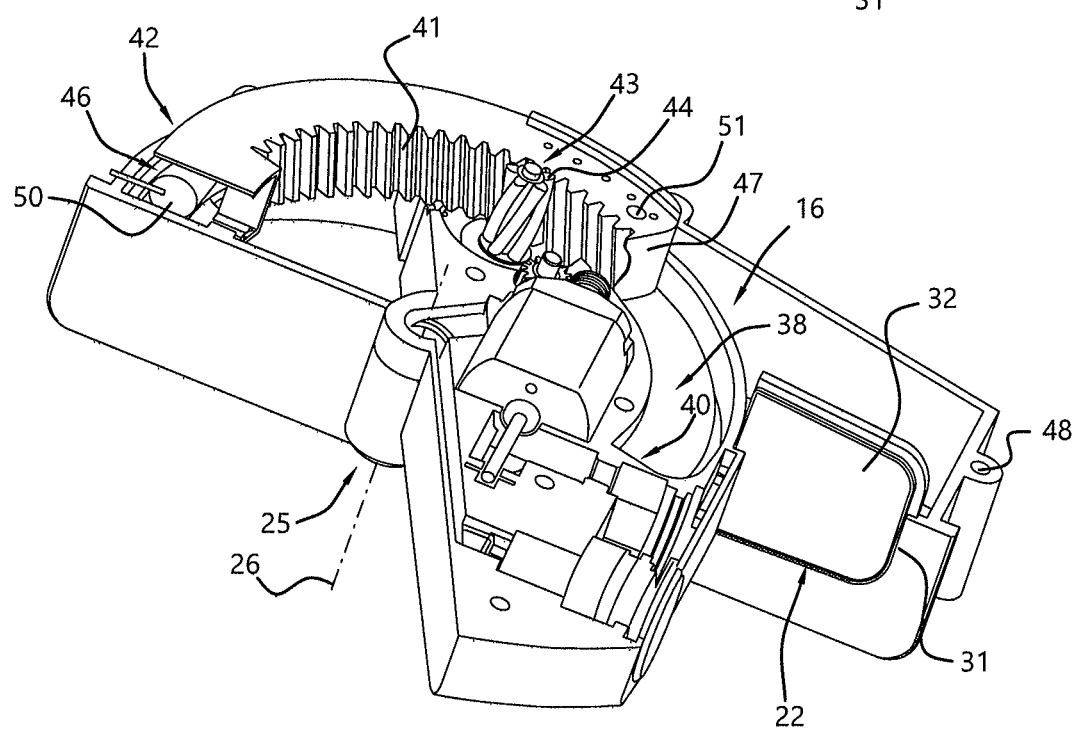
FIG. 3B shows a perspective view of an image recording device in the second position.

FIGS. 3A and B show, in partly cutaway condition, a device 12 according to the invention. In particular, a part of the housing 19 has been cut away, so that the interior work is visible. In FIG. 3A the first position is shown, in FIG. 3B the second position. The housing 19 in this embodiment comprises two shell parts 19A and 19B, of which the second part 19B is not shown but is essentially the mirror image of the first part 19A shown. The housing 19 defines a hollow inner space 36. Clearly visible is the passage opening 22 with the lid 32, which in FIG. 3A is swung away against the first part 19A and in FIG. 3B is swung up to close off the passage opening 22 with it.

FIGS. 3A and B show the carrier 16 in the first and second position. The carrier 16 in this embodiment is shown as an essentially slightly flat, partly hollow element in which an optical sensor 13 with a lens 14 is included. The carrier in this embodiment forms a camera house 24. The lens 14 is disposed behind the lens opening 29, between the lens opening 29 and the optical sensor 13. In embodiments, the material of the carrier at the location of the optical sensor, at least, of the lens opening, is vision transmissive. In the embodiment represented, the material of the carrier at the location of the optical sensor is provided with a hole which forms the lens opening. In it, a transparent sealing may be provided, such as a glass or plastic plate part. The sensor 13 is connected to a control unit 86 via suitable connecting means (not shown) such as leads, or wirelessly. Furthermore, on the carrier 16 an electric motor 37 is provided, which is connected, again via suitable means such as a lead, to a voltage source and preferably to the control unit 16. Upon movement of the carrier 16 between the first and the second position, the motor 37 moves with the carrier 16.

Along a part of the carrier, a bent track 38 is provided, which preferably describes a circular segment, with the hinge axis 26 as virtual center. Furthermore, in the housing 19, there is provided a set of teeth or rack 39, which in the embodiment shown is likewise bent, preferably likewise as a segment of a circle whose virtual center, at least in the first and second position, substantially coincides with the hinge axis 26. The rack 39 is so disposed that it can be received in the track 38 when the carrier 16 is moved to the first position. In the embodiment shown, the track 38 at an end thereof is provided with a stop 40, here implemented as an end wall, by which the first position is defined. The rack 39 is provided on its inner side with a toothing 41 and is connected by a first end 42 to the housing 19. Bearing-mounted on the carrier 16 is a pinion 43, with a toothing 44 which can fittingly engage in the toothing 41 of the rack. Via an intermediate gear 45 on the carrier, the pinion 43 can be driven by the motor 37. In the embodiment shown, a pinion 49 on a first output shaft 37A of the motor 37 engages the intermediate gear 45. Rotation of the pinion 43 will drive the carrier as a result of the toothing 44 rolling along the rack 39, so that the carrier 16 is moved between the first and the second position. Pinion is understood to also encompass a worm wheel or like gear transmission element. The carrier 16 may be suitably provided with a second stop which limits the movement of the carrier 16 relative to the rack 39 up to the second position. To this end, for instance, the rack 39 may be provided with a slot 46, for example on its outer side remote from the toothing 41, into which can reach a stop mounted on the carrier 16. The slot 46 may, as shown in FIG. 3, be closed at a second end by a wall part 47, against which the stop of the carrier butts in the second position. This hinders further movement of the carrier 16 relative to the rack 39 in the second position. Alternatively or additionally, a switch and/or sensor may be provided which registers when the second position and/or the first position is reached and then switches off the motor 37 and/or deactivates a coupling between the motor and the further drive for the movement of the carrier 16, for example by deactivating an electromechanical coupling in that drive. As a sensor, for example, a Hall sensor can be used. In FIG. 3 such a sensor is schematically indicated by reference numeral 51.

Such a device 12 is structurally simple and can be simply mounted in and/or to a body part, for example using coformed attachment points 48, screws, bolts, clamps, form closure, glue or the like. Such a device makes a fold-in position, the first position, and a fold-out position, the second position, possible in a simple manner.

Figure 8A:
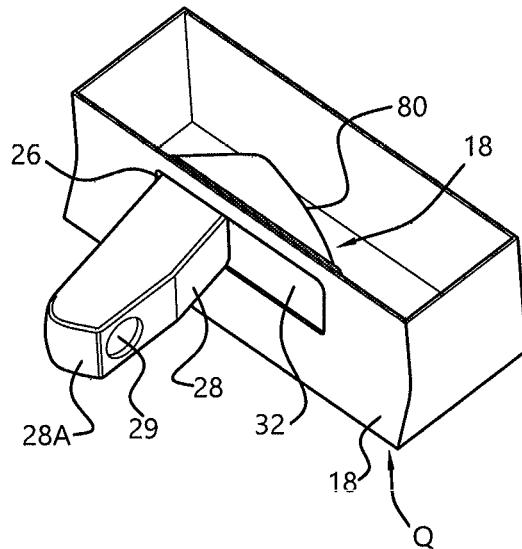
FIGS. 8A-8C show an embodiment where the image recording device in a storage position is included only partly in a body part.
Figure 8B:
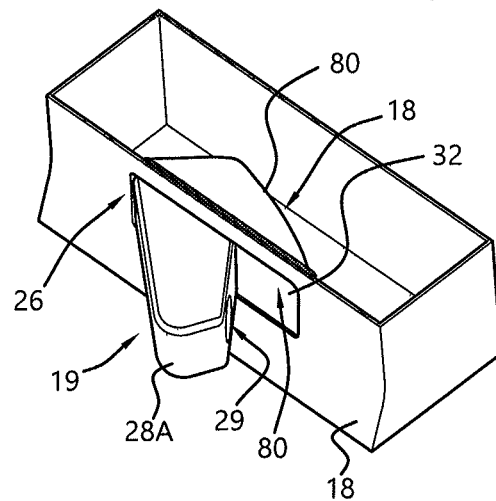
Figure 8C:
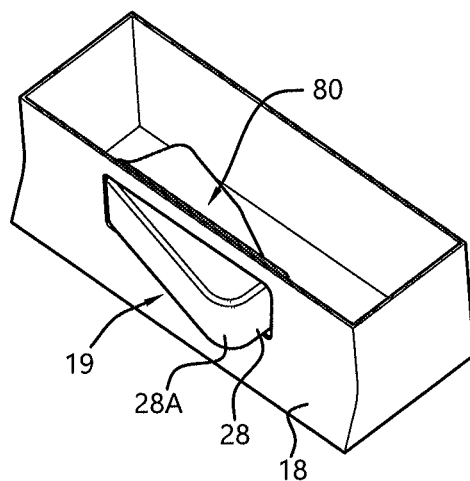

In the embodiment represented in FIGS. 8A-C, the housing 19 of the device 12 is at least partly included in a cavity 80 formed by the outer side of a body part Q, such that the body part itself remains substantially closed. The device can for instance be secured in the cavity 80 with suitable fastening means, such as, for example, glue, screws, clamping or the like.

The drive for the carrier 16 is preferably of self-locking design. The drive can advantageously comprise at least a transmission element with evoloid toothing. For example, the pinion 43 engaging the rack 39 can have evoloid toothing 44. By use of an evoloid toothing, a relatively high transmission ratio can be provided in a relatively compact way. An evoloid toothing is an adapted evolute toothing with a limited number of teeth on the pinion, preferably fewer than four. An evolute and evoloid toothing are known to those skilled in the art and are not further explained here.

Figure 4A:
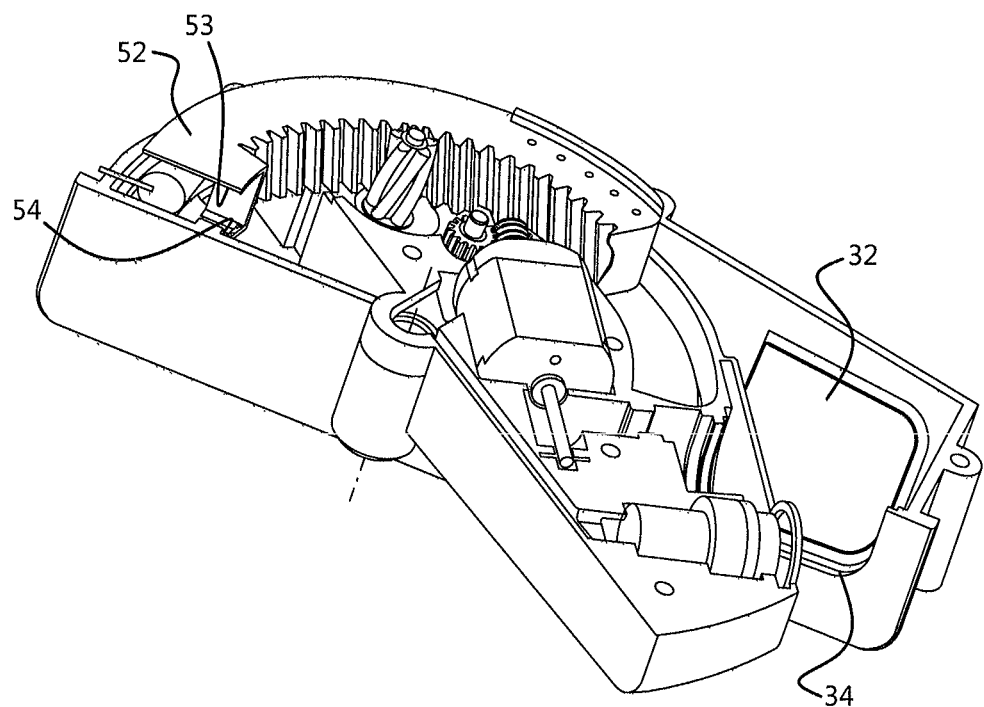
Figure 4B:
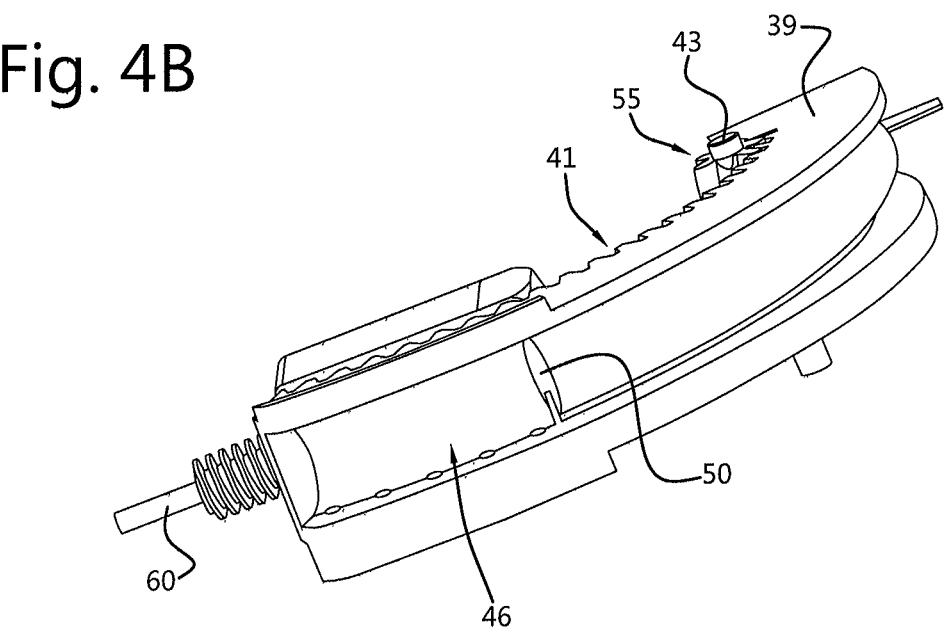
FIG. 4B shows a perspective view of the non-decoupled driving rack with draw spring.
Figure 4C:
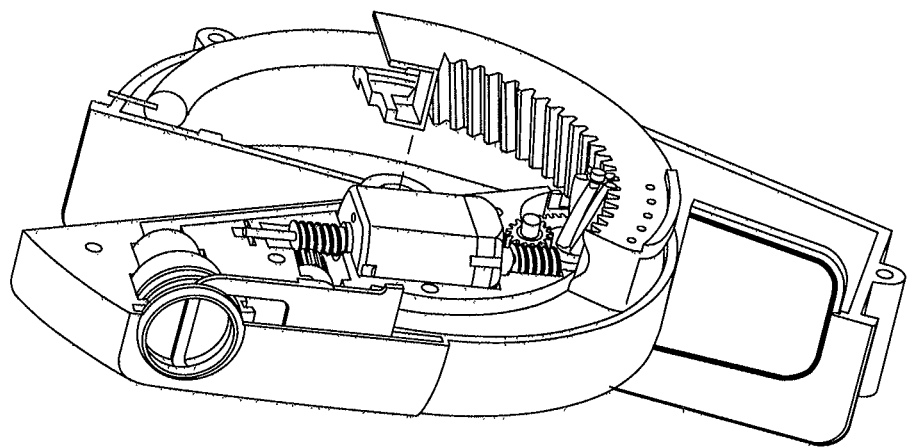
FIG. 4C shows a perspective view of the camera house after partial fold-over with decoupled driving rack.

In a particularly advantageous embodiment, a device according to the invention, as shown in FIGS. 2 and 3, can be implemented such that it also allows a fold-over position, as schematically shown in FIG. 4C. To that end, the rack 39, for instance at the first end 42, may in a decouplable manner be releasably connected to the housing 19, preferably such that when the carrier 16 has been brought in the second position and a force is being exerted on the carrier 16 that initiates further rotation around the axis 26, this coupling between the rack 39 and the housing is released. As a result, the rack 39 can move along with the rotation of the carrier 16 around the axis 26. And so the carrier 16 can move from the first position beyond the second position, preferably until the part 23 has moved substantially against the outer wall of the housing. Clearly, the rack 39 and the drive therefor may also be provided such that in the fold-over position the drive is decoupled from the rack 39. For instance, the pinion 43 may, in that position, have moved away from the rack 39, such that the carrier can freely move on from the second position and upon return to and beyond the second position is brought back into engagement again.

In the embodiment shown, the relevant end of the rack 39 is provided with two wall parts 52, for instance extending approximately parallel to each other, which are provided on the mutually facing sides with a click edge 53. The wall parts 52 are slightly resilient, so that they can move apart elastically. The housing 19 is provided with corresponding counter click elements 54 which, with the rack 39 in the regular use position, that is, in the first and second position and therebetween, engage the click edges 53 and retain the rack. If on the rack 39 a force is exerted by movement of the carrier 16 in the direction beyond the second position, then the click edges 53 are pulled loose from the counter click elements 54 and the rack can move. Upon resetting of the carrier 16, the click elements 54 and click edges 53 are coupled again. Clearly, many variants on this are possible. In embodiments, the rack may also be retained by, for example, friction, a mechanical or electromechanical coupling, or like means known to those skilled in the art.

In an advantageous embodiment, a resetting mechanism is provided to move the carrier 16 from the fold-over position back to at least the second position, when the force mentioned has been reduced sufficiently or removed. To that end, for example, a draw spring 50 may be provided between the rack 39 and the housing 19, which is extended when the rack 39 is moved towards the fold-over position, so that an elastic resetting force is obtained. The draw spring 50 here provides the advantage that it can be relatively little progressive, so that the resetting force can be sufficiently high and that the force for bringing the carrier 16 into the fold-over position can be suitably chosen. Preferably, in normal use, the spring 50 is situated for the most part in the slot 46. Alternatively, also a different resetting mechanism can be used, for example, a straight draw spring, a compression spring, a leaf spring or the like, combinations thereof, a separate drive may be provided for resetting, or resetting may be done by hand.

Figure 4D:
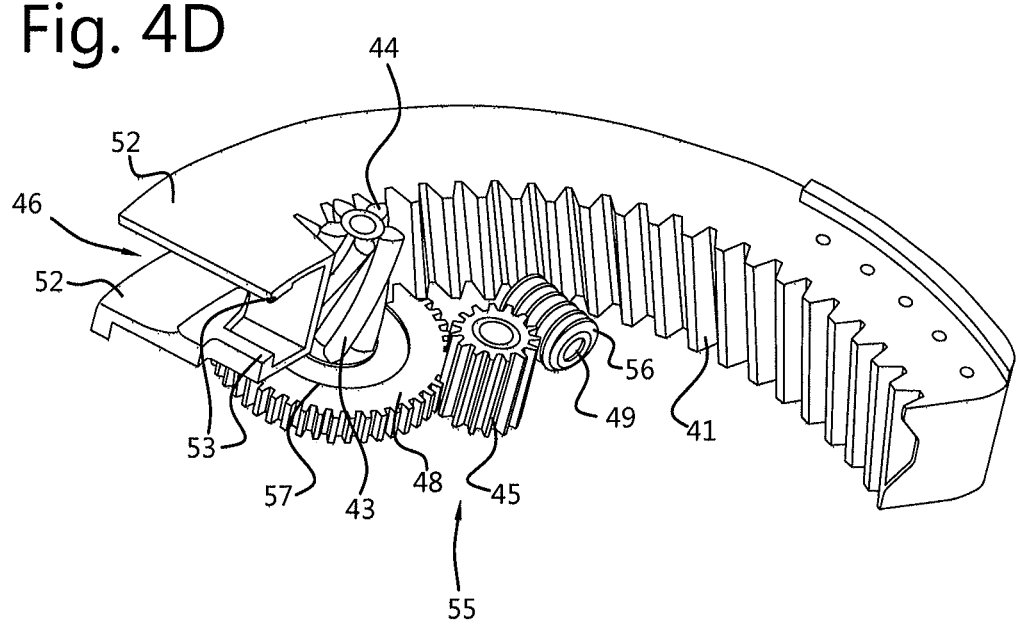
FIG. 4D shows an embodiment of the pivoting mechanism, including a slip coupling.
Figure 4E:
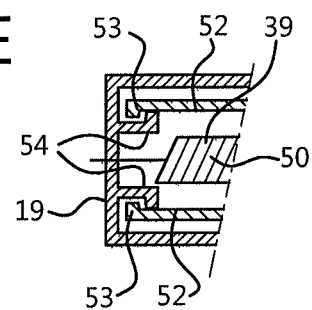
FIG. 4E schematically shows a part of the device with clamping means for retaining a driving element.

FIG. 4D schematically shows an exemplary embodiment of a drive 55 for the carrier 16, comprising a rack 39 and a series of gears as described earlier. For simplification, the motor 37 is left out here. Clearly visible are the rack 39 with toothing 41 engaged by the pinion 43 with evoloid toothing 44. Further, the pinion 49 is shown, which is, or can be, mounted on the shaft of the motor 37. The pinion 49 is provided with suitable toothing 56. An intermediate gear 45 engages the toothing 56. The pinion 43 is connected via a coupling 57 to a set of teeth 58 engaged by the intermediate gear 45. Thus, by rotation of the pinion 49, the rack 39 can be moved.

The coupling 57 can be a fixed coupling, for instance by implementing pinion 43 and set of teeth 58 in one piece. In advantageous embodiments, however, the coupling can be an active coupling 57, for example, a slip coupling or a mechanical or electromechanical coupling. Active coupling should herein be understood to mean a coupling that under certain circumstances causes the pinion 43 to rotate with the same angular speed as the set of teeth 58 but under other circumstances makes rotation of the pinion 43 relative to the set of teeth 58 or vice versa possible. By application of an active coupling, the motor 37 and hence the pinion 49 can be driven while the rack 39 stands still. Clearly, in a similar manner, such an active coupling 57 may be arranged at a different position within the drive 55, for example between the motor 37 and the pinion 49. With this, overloading of the motor is prevented.

Figure 6A:
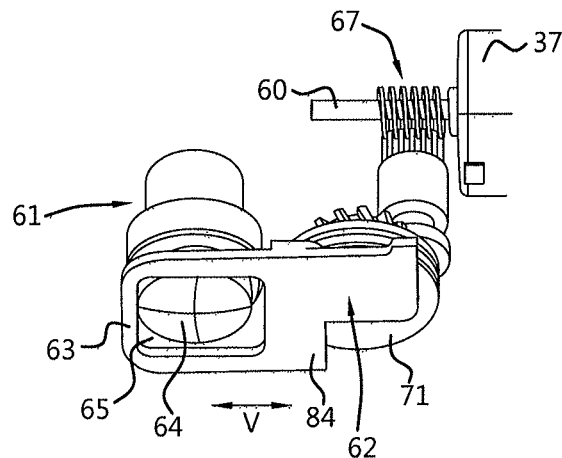
FIGS. 6A-6D show an embodiment of the wiping device with position sensor.
Figure 6B:
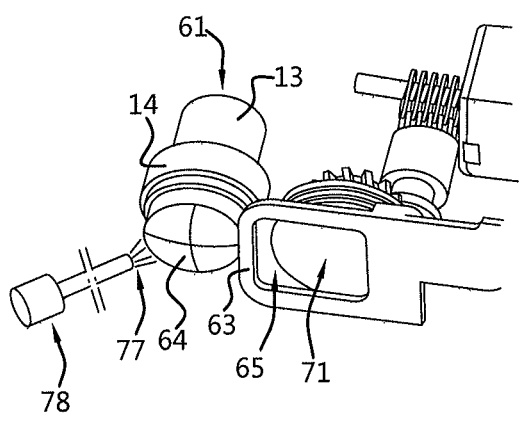
Figure 6C:
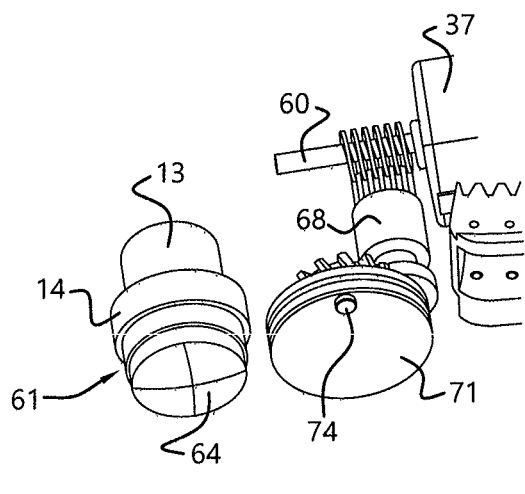
Figure 6D:
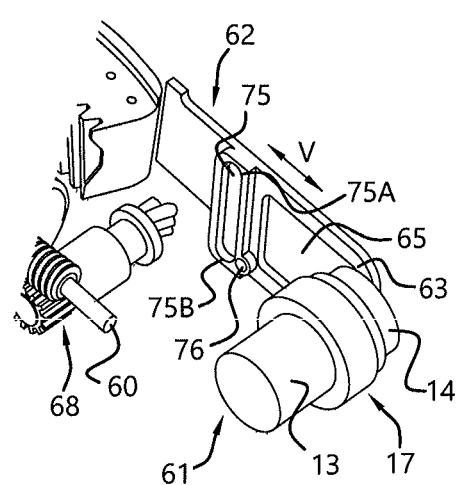
Figure 7:
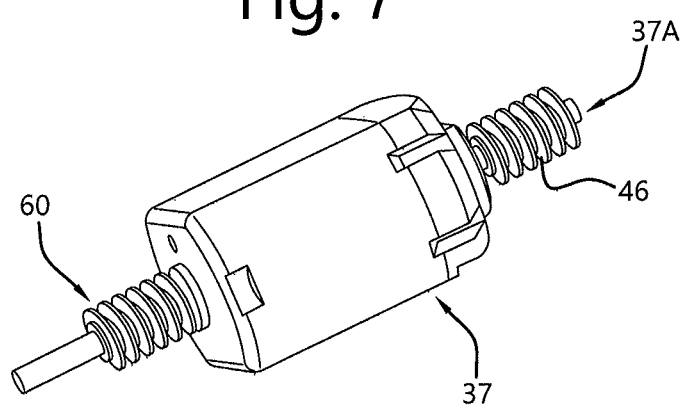
FIG. 7 shows a DC motor provided with a worm at both shaft ends.

As will be discussed hereinafter, an active coupling 57 as discussed above, in embodiments, provides the advantage that the motor 37 can be used for driving other elements than the carrier 16, also when the carrier, for instance in the first or the second position, stands still. Thus, for instance, a cleaning device 59 can be driven by the motor 37, as will be elucidated on the basis of an exemplary embodiment as shown in FIGS. 5-7. To this end, the motor 37 can for instance, as schematically shown in FIG. 7, be provided with a second output shaft 60. Also, for example, the optical sensor 13 or an optical element 14, such as a lens, prism, or the like, can be driven by the motor, for example to rotate between a position where images can be recorded through the lens opening 29 and a position in which images can be recorded through the window 33.

Figure 5A:
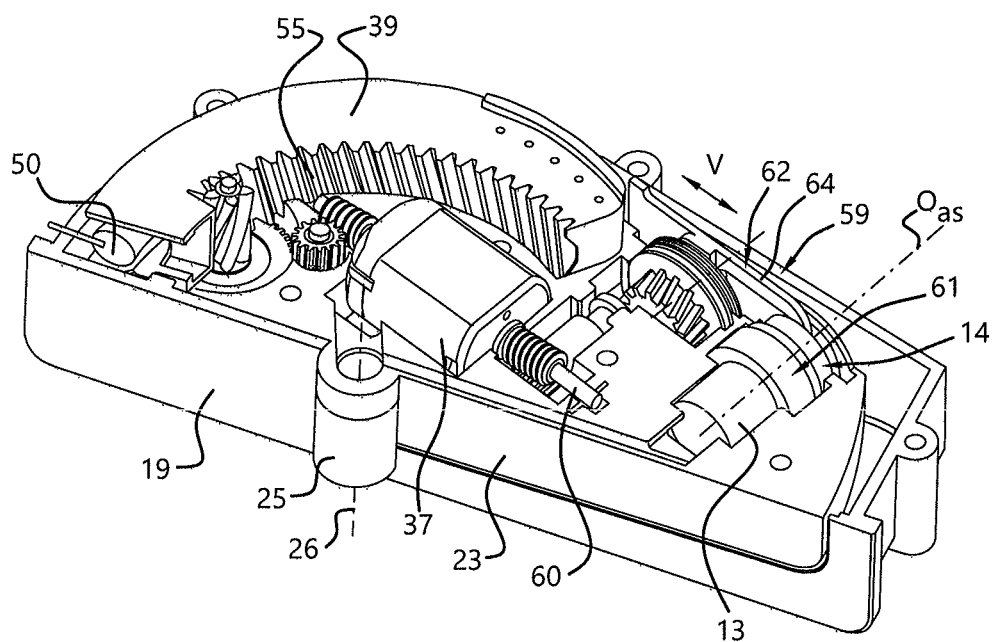
FIG. 5A shows a perspective view of an image recording device provided with the cleaning device.
Figure 5B:
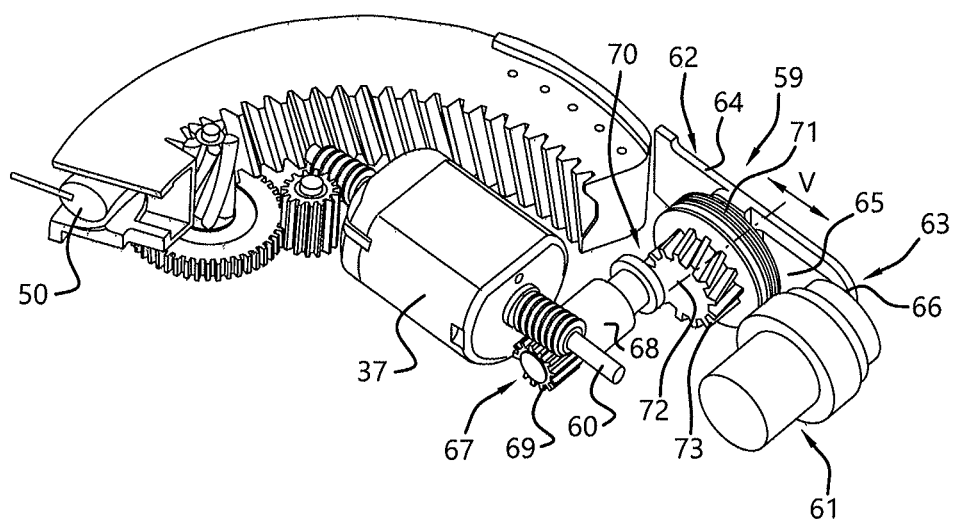
FIG. 5B shows a side view of the cleaning device.
Figure 5C:
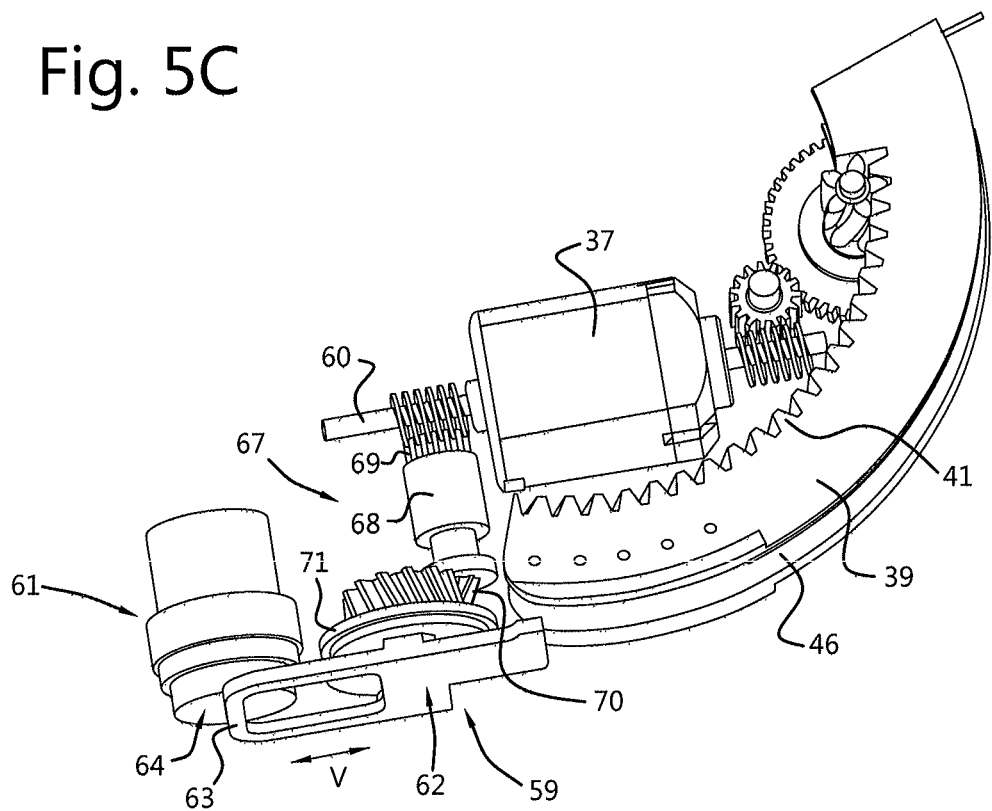
FIG. 5C shows a top plan view of the cleaning device.

In FIGS. 5A-C, in different views, schematically, a cleaning device 59 is shown, with the drive 55 for the carrier 16. In FIG. 5A these are shown inside of the partly opened housing 19, in FIGS. 5B and C outside of it. It will be clear that a cleaning device 59 as discussed here can also be used with other devices, for example, camera systems that are disposed stationarily or in other positions, and/or camera systems with an alternative carrier and/or that are driven in a different manner, for example, known camera systems such as described in the introduction, in particular also camera systems that are arranged on or near a rear side of a vehicle.

As shown in particular in FIGS. 5B and C, an optical sensor 13 with a lens or lens system 14 may be provided on the carrier, behind a lens opening 29. In the figures, the optical sensor 13 along with lens 14 are shown as an optical unit 61. Clearly, though, they may also be provided separately, for example optically coupled by mirrors, lenses and/or optical guides such as fibers. Preferably, both the sensor 13 and the lens or lenses 14 are carried on the carrier 16. In particular the sensor 13, though, may also be provided stationarily in the housing, or even outside it, with a lens or lens system that is provided on the carrier 16 being optically coupled by, for example, an optical fiber.

In the exemplary embodiment shown, the optical unit 61 defines an optical axis O which in this embodiment is approximately perpendicular to the output shaft 60 with which the cleaning device 59 can be driven. This position, however, can be chosen freely. A wiper element 62 is provided which can move with a wiper strip 63 over a lens surface 64 of the lens 14. In the embodiments shown, the wiper element 62 is included within the housing 19 and can reciprocate, in particular in a translating movement V. However, provision may also be made for a different movement, for example a rotating movement or a pivoting movement such as of windscreen wipers of cars. In the exemplary embodiment shown, the wiper element 62 comprises a substantially planar, plate-shaped part 84 with an opening 65 which is preferably so large that if the lens 14 is behind the opening, the lens surface lies at least substantially free behind the opening 65 and vision through the lens 14 and through the opening 65 is substantially not influenced by edges of the opening 65. The wiper strip 63 in this embodiment is implemented as a longitudinal edge of the opening 65 and may be provided with a slightly flexible, cleaning surface such as, for example, a rubber or elastomeric strip 66 on the side facing the lens 14, which strip is pressed against the lens 14 by the wiper element 62.

Provided between the output shaft 60 of the motor 37 and the wiper element 62 is a second drive 67, with which the rotary movement of the shaft 60 is converted into a desired movement, in particular a translating movement V of the wiper element 62 with the strip 66, whereby the lens surface 64 is cleaned. To that end, in the exemplary embodiment, the second drive 67 comprises a shaft 68, bearing-mounted in the carrier 16, having toothings 69, 70 at two opposite ends. Furthermore, a disc 71 is provided which is placed on a side of the wiper element 62 facing the interior of the housing. The disc can rotate about an axis 72 which is preferably approximately perpendicular to the plane of the wiper element 62. The disc 71 is provided with a gear 73 on a side remote from the wiper element 62. The first toothing 69 of the shaft 68 engages the toothing 73 on the output shaft 60 of the motor 37 and the second toothing 70 of the shaft 68 engages the gear 73 of the disc 71. Rotation of the output shaft 60 will therefore drive the disc 71 around the axis 72. On its side facing the wiper element 62, the disc 71 is provided near its circumference with a pin 74, as shown in FIG. 6C. The wiper element 62, on its side facing the disc 71, is provided with a slot 75 extending, for instance, approximately parallel to the strip 63. The pin 74 reaches into the slot 75, such that a rotation of the disc 71 around the axis 72 will cause the pin 74 to move through the slot 75, back and forth between two opposite ends 75A, B thereof, as a result of which the wiper element 62 will make the above-described back-and-forth movement V, along the lens surface 64. To that end, the wiper element 62 is preferably guided through a matching guide in the housing 19. The pin 74 is preferably positioned on the disc such that a rotation of the disc 71 through an angle of 180 degrees can move the strip 63 from a first side of the perimeter of the lens 14 to an opposite second side of the perimeter of the lens 14, so that the entire surface of the lens 14 is cleaned, in particular cleaned twice with each full rotation of the disc 71.

As described, the motor 37 can continue to drive the output shaft 60 or shafts 37A, 60, also when the carrier 16 is in the second position. So, with the same motor 37, the cleaning device 59 can be driven also in the second position. In advantageous embodiments, for the cleaning device, at least one position sensor 76 is provided, with which, when the motor is switched off or the drive is interrupted otherwise, the wiper element 62 is halted such that the strip 63 is preferably at least substantially not in front of the lens 14 anymore. To this end, for example, a Hall sensor may be provided. Thus, for instance in the exemplary embodiment shown, it can be ensured that the disc 71 stops only when the pin 74 is approximately in the middle of the slot.

In exemplary embodiments, near the lens surface 64 or, at least, near the wiper element 62, a blow nozzle 77 of a blowing device 78 may be provided. The blowing device 78 can blow, for example, air or fluid against the wiper strip 63 and/or the lens surface 64.

In the exemplary embodiments shown, the drive of the carrier 16 is indirect, by the motor 37. This is to say that between them, at least one gear or like transmission is provided. It is also possible, however, to drive the carrier in a different manner, for example, with a motor directly on the hinge or hinge axis 26, or by use of, for example, a pneumatic, hydraulic and/or electromagnetic drive. Also, for the carrier 16 and a cleaning device 59, separate drives and in particular power sources may be used, such as, for example, two motors.

A device 12 such as, for example, according to any one of FIGS. 2-7, can, in embodiments as shown or similar to that according to FIG. 8, be mounted on an outer side of an outer surface 18 of the body part Q, for example in the cavity 80 defined by that surface.

Figure 9:
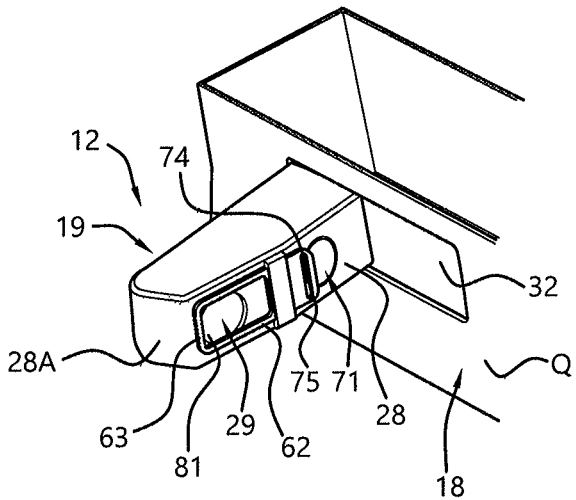
FIG. 9 shows an embodiment in which a lens opening is provided that is closed off by a transparent surface, with a cleaning device.

In FIG. 9, an embodiment is shown of an image recording device 12, for example similar to one according to any one of the preceding figures, where a cleaning device is arranged for the most part on the outer side of the housing 19. The lens opening 29 in this embodiment is provided with a transparent sealing 81. Thus, in embodiments, the housing can be made of wholly dust- and water-tight design. The cleaning device 59 in this embodiment is provided with a wiper element 62 with wiper strip 63 for cleaning the sealing 81. To this end, the cleaning device, in embodiments, can be substantially the same as that as shown in, for example, FIGS. 5 and 6, where the shaft 60 extends through a wall 28 of the housing 19, preferably sealed in a suitable manner, and the disc 71 is mounted against the outer side of the wall 28, or the disc 71 is rotatably bearing-mounted in an opening in the wall 28, so that the wiper element 62 can be moved back and forth. It will be clear, however, that a different cleaning device may be applied as well, for example, a wiper such as a windscreen wiper of a car. In such embodiments, in the first position, the storage position, the cleaning device is protected in that it is at least substantially wholly included in the body, or at least between the housing and the body part Q.

Figure 10A:
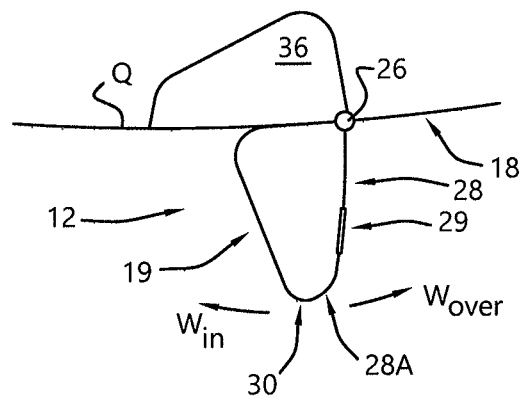
FIGS. 10A-10C schematically show a further, alternative embodiment of a device according to the invention.
Figure 10B:
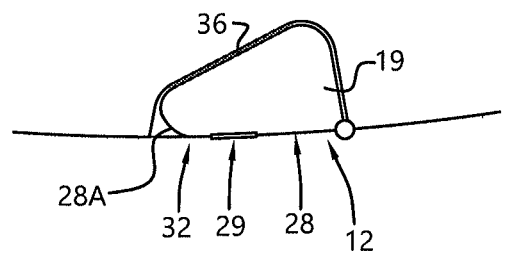
Figure 10C:
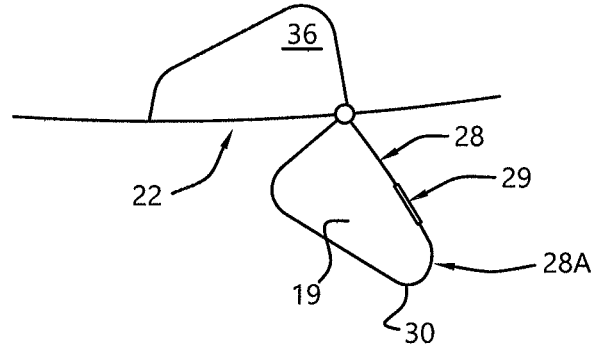

FIG. 10 schematically shows an alternative embodiment of a device 12 according to the invention, which in structure is substantially the same as the exemplary embodiments described earlier, but where the pivot axis 26 is positioned differently, viz., on the other side of the carrier than in the embodiments described earlier. In this embodiment, the wall 28 is provided in a manner adjoining the pivot axis 26, so that the lens opening 29 and the pivot axis 26 are provided on the same side, as is visible in FIG. 10A, in which the second position is shown. From the second position, the carrier 16 can be pivoted to the first position, as shown in FIG. 10B, in the direction Win. Also, the device 12 can be pressed in the same direction into a fold-over position, or in the opposite direction Wover in a fold-over, as shown in FIG. 10C. In this embodiment, again a lid 32 may be provided for closure of the opening through which the device can move. In this embodiment, in the first position the lens opening 29 is on the side facing outside. As a result, with the same optical sensor 13, recordings can be made also in the first position, for example for the purpose of image recognition of people or objects approaching the vehicle 1.

In an advantageous further implementation, the device may be controlled via the control unit 86. Thus, for instance, a circuit may be provided that brings the device in the second position as soon as a door of the vehicle is unlocked or when an operating button on a remote control or FOB associated with the vehicle is operated. Similarly, a circuit may be provided which brings the device back into the first position when the doors of the vehicle are locked or when an alarm device is set into operation, or when the above-mentioned operating button of the remote control is operated. When an embodiment is used that allows images to be recorded also when the device has been brought into the first position, for example through the window 33, the device may also be switched on when an image is recognized by software in or of the control unit 86. Thus, it may for instance be determined on the basis of pattern recognition whether the device must be energized, and it may be established on the basis of image recognition whether, for instance, the vehicle must be unlocked. In the embodiments shown, the device is provided with a substantially closed housing.

The invention is not limited in any way to the examples given in the drawing and description. Many variations thereon are possible within the framework of the invention as defined by the claims, including at least combinations of parts of the embodiments shown. In embodiments, the motor with the drive may be so configured that the drive pushes off from a body part Q and thereby pushes out the carrier 16. Further, for example, the orientation of the pivoting direction may be chosen differently, for example such that the lens opening in the second position is directed forward or down. Also, the drive can be used for adjusting, for example, the optical means, for instance such that in the first position images can be registered through the window and in the second position through the lens opening.

What is claimed:

1. An image recording device provided with a fixed part for at least partial inclusion on the body of a motor vehicle, and a movable part which contains at least one optical element, the optical element comprising at least one optical sensor and/or a lens unit, and an adjustment device, provided with a power source, for adjusting the movable part between a first position and a second position, wherein during use in the first position the movable part is in a folded in position, and in the second position the movable part extends at an angle with respect to the body, such that at least the optical element carried by the movable part extends at least partly outside the body, wherein the movable part pivots from the second position about a, substantially vertical, axis to the first position and vice versa, wherein:
the movable part is movable between the first position and the second position with the aid of a motor and a first drive of the adjusting device, wherein the movable part, viewed from the first position, is movable beyond the second position to a third position by an external force exerted on the movable part, wherein the first position defines a fold-in position, the second position a fold-out position and the third position a fold-over position.

2. The image recording device according to claim 1, wherein the device is provided with a housing which is part of the fixed part and a carrier which is part of the movable part, wherein the carrier pivots between the first position and the second position around an axis which is located in or close to an outer surface of the body.

3. The image recording device according to claim 1, wherein the drive comprises a releasable or slipping coupling.

4. The image recording device according to claim 1, wherein the movable part in the first position is substantially wholly enclosed in a housing of the fixed part, and in a second position extends partly outside said housing, through a passage opening in the housing, wherein one or more lids is provided which, with the movable part in the second position, closes off a part of the passage opening.

5. The image recording device according to claim 4, wherein the one or more lids is provided such that in the first and/or second position of the movable part it substantially closes off the housing from the outside air, and in intermediate positions allows the movable part to pass.

6. The image recording device according to claim 4, wherein each lid of the one or more lids is under spring action, biased in a position closing off the passage opening.

7. The image recording device according to claim 4, wherein each lid of the one or more lids is driven by a rotation power source, a bimetal or an MSM element.

8. The image recording device according to claim 1, wherein at least the motor is carried by the movable part.

9. The image recording device according to claim 1, wherein a cleaning device is provided for at least one optical element.

10. The image recording device according to claim 9, wherein the cleaning device comprises a translating or rotating wiping device.

11. The image recording device according to claim 9, wherein the cleaning device is driven by the same motor as the adjustment mechanism.

12. The image recording device according to claim 9, wherein the cleaning device is provided with a position sensor for stopping a movement of a wiping device of the cleaning device near or outside an outer edge of a surface to be cleaned by the wiping device.

13. The image recording device according to claim 9, wherein the cleaning device is provided with a blowing device.

14. The image recording device according to claim 13, wherein the blowing device is an air nozzle or a liquid nozzle.

15. The image recording device according to claim 9, wherein the cleaning device can be energized both in the first and in the second position of the movable part.

16. The image recording device according to claim 9, wherein the cleaning device is provided for a lens surface and/or a window of or for a lens opening in the housing.

17. The image recording device according to claim 9, wherein the cleaning device is operable in each position of the adjustable part.

18. The image recording device according to claim 1, wherein the adjustment device and at least one of the one or more lids or the cleaning device are drivable by the same motor.

19. The image recording device according to claim 1, wherein upon movement of the movable part between the second position and the third position, at least the motor and the first drive move along with the movable part.

20. The image recording device according to claim 1, wherein in the movable part a window is provided through which, with the movable part in the first position, image recordings can be made with the aid of an optical sensor.

21. A vehicle in which is included at least an image recording device according to claim 1.

22. The vehicle according to claim 21, wherein at least such an image recording device is included in a body part on a lateral side of the vehicle.

23. The vehicle according to claim 22, wherein the image recording device is provided on one of a door, a fender, an A, B, C and/or D post, or a roof of the vehicle.

24. The vehicle according to claim 21, wherein the image recording device has an optical axis which in the second position of the movable part is directed substantially rearwards, approximately parallel to a surface on which the vehicle is set up.

25. The vehicle according to claim 24, wherein a control unit is provided for control of the image recording device, with which at least the device can be moved between the first and the second position.

26. The vehicle according to claim 25, wherein with the aid of the control unit at least one of the optical axis, an angle of view, or an angle of vision of optical means of the device can be set.

27. The vehicle according to claim 24, wherein a distance X between an outer surface of a body part on which the device is mounted and the optical axis, measured along a normal to said surface that extends through the lens opening and the optical axis, is approximately equal to or greater than a distance Y between the hinge axis of the carrier and said normal, measured perpendicular to said normal.

28. The image recording device according to claim 1, wherein in the movable part a window is provided through which, with the movable part in the first position, image recordings can be made with the aid of the same at least one optical element carried on the movable part.

29. An image recording device provided with a fixed part for mounting on the body of a motor vehicle, and a movable part which contains at least one optical element, the optical element comprising at least one optical sensor and/or a lens unit, and an adjustment device, provided with a power source, for adjusting the movable part between a first position and a second position, wherein during use in the first position the movable part is in a position folded against the body, and in the second position the movable part extends at an angle with respect to the body, such that at least the optical element carried by the movable part extends at least partly outside the body, wherein the movable part pivots from the second position about an axis to the first position and vice versa, wherein the movable part is movable between the first position and the second position with the aid of the adjusting device, wherein the movable part, viewed from the first position, is movable beyond the second position to a third position by an external force exerted on the movable part, wherein the first position defines a fold-in position, the second position a fold-out position and the third position a fold-over position.

30. The image recording device according to claim 29, wherein further positions are provided for the movable part, providing a different view and/or different vision angles.

31. The image recording device according to claim 29, wherein image recognition software is provided for control of the image recording device or parts of a vehicle comprising such image recording device.

32. An image recording device provided with a fixed part for mounting on the body of a motor vehicle, and a movable part which contains at least one optical element, the optical element comprising at least one optical sensor and/or a lens unit, and an adjustment device, provided with a power source, for adjusting the movable part between a first position and a second position, wherein during use in the first position the movable part is in a position folded against the body, and in the second position the movable part extends at an angle with respect to the body, such that at least the optical element carried by the movable part extends at least partly outside the body, wherein the movable part pivots from the second position about an axis to the first position and vice versa, wherein the movable part is movable between the first position and the second position with the aid of the adjusting device, wherein a control unit is provided for control of the image recording device, with which control an optical axis of the optical means of the device can be set, in one of:
  directed substantially rearwards; and
  directed upward and/or downward.

* * * * *